United States Patent [19]

Sublette

[11] Patent Number: 4,581,120
[45] Date of Patent: Apr. 8, 1986

[54] METHOD AND APPARATUS FOR SEPARATING OILFIELD EMULSIONS

[75] Inventor: Kerry L. Sublette, Tulsa, Okla.

[73] Assignee: Combustion Engineering, Inc., Windsor, Conn.

[21] Appl. No.: 652,364

[22] Filed: Sep. 19, 1984

[51] Int. Cl.⁴ .................. B01D 17/06; B03C 5/02; C10G 33/02

[52] U.S. Cl. .................................. 204/302; 204/308

[58] Field of Search .................. 204/302, 306, 308

[56] References Cited

U.S. PATENT DOCUMENTS

| | | | |
|---|---|---|---|
| 2,825,686 | 3/1958 | Greene | 204/302 |
| 2,846,389 | 8/1958 | Downing | 204/302 |
| 3,476,678 | 11/1969 | Murdock, Sr. | 204/302 |
| 3,577,336 | 5/1971 | Shirley | 204/302 |
| 4,469,582 | 9/1984 | Sublette | 204/302 |

Primary Examiner—T. M. Tufariello
Attorney, Agent, or Firm—Troxell K. Snyder

[57] ABSTRACT

A multistage separator for oilfield emulsions is disclosed. The separator utilizes a mechanical inclined plate separator constructed of electrically nonconductive materials disposed downstream of an electrostatic separation section. Electrostatic charges imparted to the flowing emulsion by the electrostatic section migrate to the mechanical portion and establish a surface charge on the inclined plates thereof. This surface charge results in enhanced coalescence of the aqueous and nonaqueous dispersions present in the emulsion.

5 Claims, 3 Drawing Figures

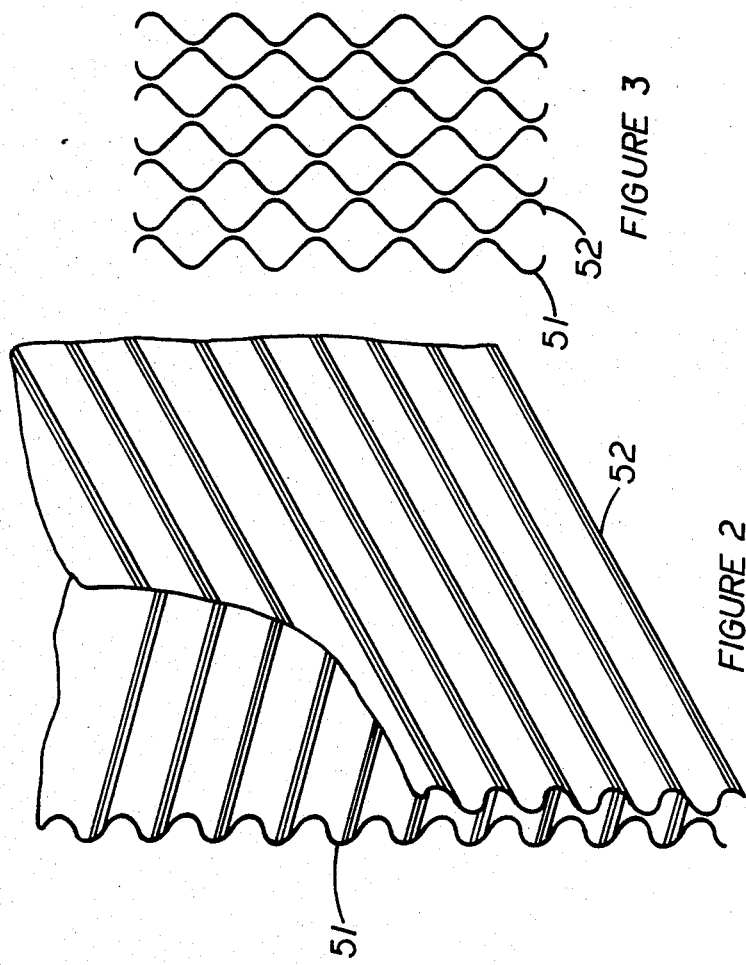

METHOD AND APPARATUS FOR SEPARATING OILFIELD EMULSIONS

FIELD OF THE INVENTION

The present invention relates to a method and an apparatus for separating an emulsion of oil and water, and more particularly to a method and an apparatus for separating a flowing emulsion of oil and water wherein the emulsion flow is passed sequentially through an electrostatic separation section and a mechanical separation section.

BACKGROUND OF THE INVENTION

There is an omnipresent need in the oil industry for rapid, high volume liquid/liquid separation in which one of the liquid phases is conventional crude oil, synthetic crude oil produced from tar sands, or shale oil, and the other is water or brine. Oil and water are of course immiscible, however an aqueous phase is frequently present in produced oil as a highly dispersed, discontinuous phase. Such a mixture is referred to as an emulsion. The source of this aqueous is formation water and/or water or steam injected into the underground reservoir to enhance recovery of crude oil.

One method of separation commonly used in the industry involves the use of high voltage electric fields. Two mechanisms apparently operate to bring about coalescence of droplets of a relatively polar phase such as water or brine, in an nonpolar medium such as oil. First the water droplets may acquire a net electrical charge by direct contact with a charging electrode, or through convective transfer of charge from the electrode by the oil. A force of attraction will exist between water droplets which have acquired opposite charges. Secondly, the electrical gradient experienced by the entrained water droplets causes the droplets to become polarized through alignment of the polar water molecules with the external field and through the redistribution of mobile charged particles within the water droplet. Attractive electrostatic forces will exist between oppositely charged regions of neighboring water droplets. The relative importance of these two mechanisms is evidently determined by the physical and chemical properties of the two phases. Of particular importance is the electrical conductivity of the oil. Whichever mechanism predominates, attractive electrostatic forces increase both the frequence of collisions and the coalescence rate of the entrained water droplets.

Such a high voltage electrostatic coalescing system is subject to certain limitations with respect to the maximum water droplet size which may be achieved within a given system. These limitations are well discussed in a copending application Ser. No. 360,253 filed on Mar. 22, 1982 and will therefore not be discussed here in detail. Suffice to say that the larger is the water droplet formed in an active electrostatic separator, the more readily it may be dispersed by both hydrodynamic forces and electrical stresses present within such a separator. The maximum droplet diameter realistically achievable is determined by the physical properties of the both the aqueous phase and the organic phase and the characteristics of the electrostatic field employed.

The basic limitations of electrostatically enhanced coalescence as discussed above suggest that there are opportunities for significant improvement in electrostatic dehydration as conventionally practiced. If water droplet diameters can be increased beyond the upper limit of an electrostatic system, retention times required to effect adequate phase disengagement will be reduced. One potential improvement is the utilization of a mechanical coalescence medium, such as an inclined surface separator, downstream of a system of charged electrodes.

INCLINED SURFACE SEPARATORS

The term "inclined plate, or surface, separator" is herein defined as any device which functions to separate a dispersed liquid phase from a second immiscible, continuous liquid phase on the basis of a difference in density which incorporates the following features:

(1) the total flow is divided multiple channels wherein a droplet of the dispersed liquid phase has only a short distance to rise or fall before being collected at a surface;

(2) the collection surfaces are inclined so that collected droplets of the dispersed liquid phase will move along the surface, encounter other droplets of the dispersed phase, and coalesce to form larger droplets prior to leaving the surface.

The inclined surface separator is perhaps best typified by the tilted plate separator developed many years ago by Royal Dutch Shell. The most common application of this separator has been in the removal of oil and sludge from refinery waste water streams. The separator generally consists of an array of parallel flat or corrugated plates. The material for these plates may be metal, plastic, or fiberglass. Assembled, the array of plates are mounted in the flowstream at an angle with respect to the horizontal to become collection surfaces for the dispersed liquid of the stream. In typical operation, the droplets of oil rise the short distance between the plates, contact the bottom surface of a plate, move upward along the plate, and coalesce with other collected oil droplets. As a result, the coalesced oil droplets leaving the surfaces of the plate array are larger than those which enter the plate array. The larger drops rise at a greater velocity and are more effectively removed from the aqueous phase than the smaller droplets of the plate array influent. The increase in size of oil droplets effected by this form of separator significantly reduces the retention time required for adequate phase disengagement. Retention time is generally further reduced by the favorable, even-flow distribution created by hydraulic friction along the plates. Turbulence and large scale flow short circuiting are reduced. Decreased retention time translates into reduced vessel size and savings on capital expenditures.

Though the inclined surface separator has found past application in the removal of oil from waste water streams, the separator is equally well suited for the removal of droplets of an aqueous phase from oil. In this application, the dispersed droplets of the aqueous phase simply fall, under the influence of gravity, the short distance between the plates where the collect and coalesce with other water droplets as they move down an inclined surface.

Inclined surface separators are subject to certain limitations with respect to the size of the dispersed phase droplet which may be collected. It is well known that the settling velocity of droplets of a dispersed phase, whether it be oil or water, in a second, immiscible continuous phase, increases with the square of the droplet diameter. For a given two-phase system, there is always a dispersed phase droplet size below which any device which depends on gravitation to affect separation, will be impractical. For example, in the removal of oil dispersed in water, it is generally accepted that it is economically and technologically impractical to attempt removal of oil droplets smaller than 80 microns with this type of separator.

SUMMARY OF THE INVENTION

The present invention provides an oil-water emulsion separator for use with a flowing emulsion stream such as may for example issue from an enhanced recovery oil well or the like. The invention provides an active electrostatic separator followed by an inclined plate separator constructed of electrically non-conductive materials. Electrical charges, imparted to the emulsion by the electrostatic separator, are carried by the emulsion to the fixed plates and accumulate on the plate surface.

The combined effect of the sequential separation techniques and the electrical charges accumulated on the plate surfaces produces an emulsion separator superior to those known in the prior art and able to handle emulsion flow rates without significant degradation of the quality of separation.

It is therefore an object of the present invention to provide a combined electrostatic and mechanical separator for use in dividing flowing emulsions of oil and water such as those produced by marginal or enhanced recovery petroleum wells or the like.

It is further an object of the present invention that the inclined plate or mechanical separator be constructed of electrically non-conductive materials to allow the accumulation of the electric charges on the surfaces thereof, the electrical charges being transferred by the flowing emulsion from the electrostatic separator to the mechanical separator, thereby enhancing the separation of the emulsion.

It is still further an object of the present invention to provide an emulsion separator that is efficient at high emulsion flow rates without significant degradation of separation quality.

BRIEF DESCRIPTION OF THE DRAWING FIGURES

FIG. 2 shows a detailed view of the mechanical separation section of the preferred embodiment of the present invention.

FIG. 3 shows an alternative view of the preferred embodiment mechanical separator.

DETAILED DESCRIPTION OF THE PREFERRED EMBODIMENT

Figure 1:
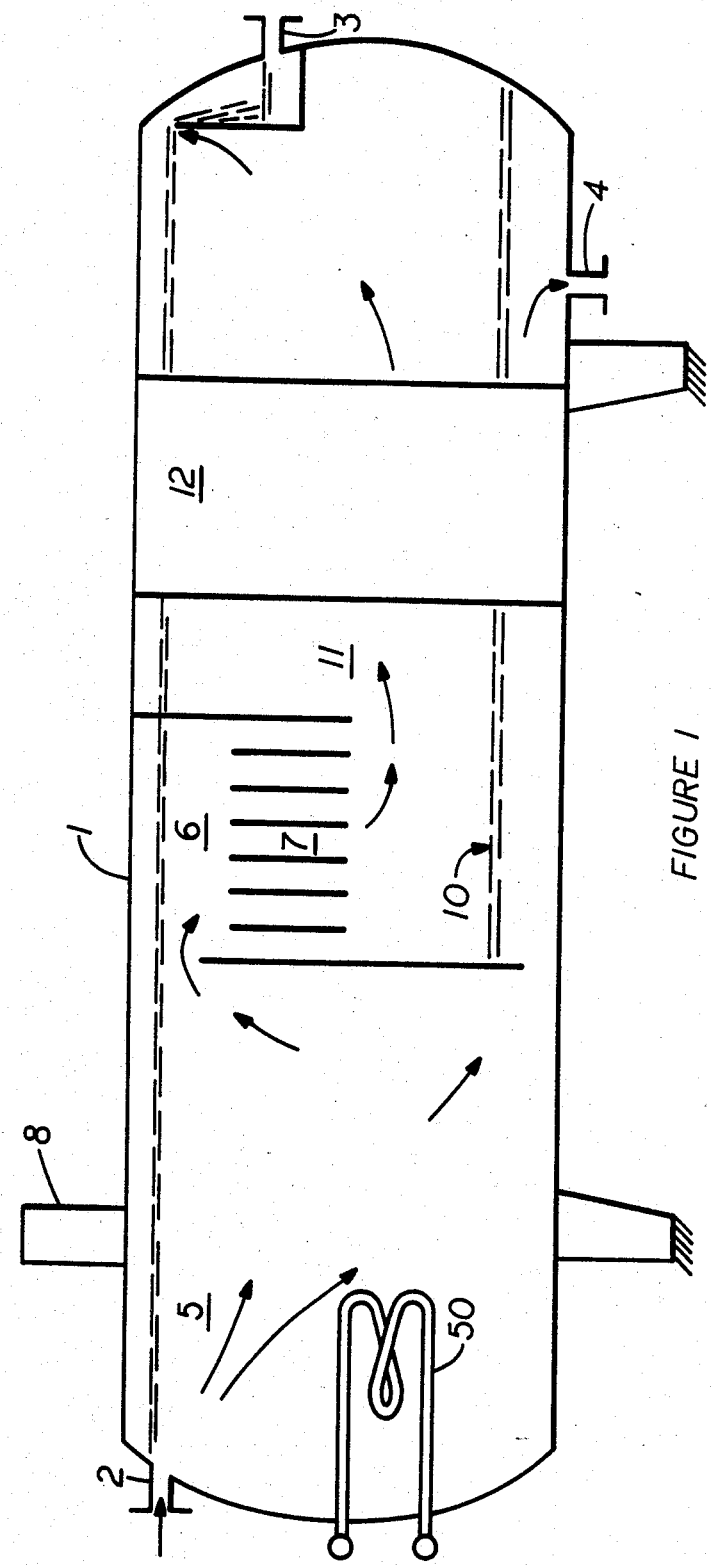
FIG. 1 is a sectioned elevation of a horizontally elongated vessel having an electrode system and a mechanical inclined surface separator.

FIG. 1 discloses a sectioned elevation of a horizontally elongated shell 1 in the simplest terms. An emulsion of oil and water is introduced into the left hand end of the shell or vessel 1 through conduit 2. Separated according to the present invention, the oil is removed from the vessel 1 through upper outlet 3 located at the right hand end. There may be gas in the emulsion introduced into the vessel 1. For the purposes of disclosing the present invention, the gas will be ignored as the invention is directed to the liquid/liquid separation of oil and water.

Internally, the vessel encloses a separation section divided into several portions. The first portion 5 simply shows that a heat source 50 within this portion is arranged to be contacted by the emulsion stream flowing through portion 5. The purpose of this arrangement is to elevate the temperature of the emulsion stream as may be required to enchance the liquid/liquid separation carried out by the downstream embodiment of this invention. Of course, this heat input to the well stream could be supplied by a heater in conduit 2 established upstream of vessel 1. On the other hand, it may not be necessary to introduce any heat into the well stream in thermal preparation for its processing.

ELECTROSTATIC PORTION

Portion 6 is downstream of optional heater portion 5 and receives the emulsion within the temperature range suitable for initiation of the liquid/liquid separation in the electric field of portion 6. The electric field in portion 6 is generated between electrodes 7, the electrodes being charged from a transformer 8. The arrangement of electrodes 7, the baffles required to properly direct the well stream through the electric field, and all other mechanical and circuit arrangements need not be discussed here in all of their available variations. The art is replete with the many variations for effective application of electric fields to the resolution of mixtures of relatively polar liquids dispersed in relatively non-polar liquids.

The end result of passing the emulsion stream through electrostatic separation portion 6 is that the water, or aqueous phase, is formed into drops of increased size. Some are large enough to initiate their gravitation into a body of water 10 in the lower part of the shell 1.

DISENGAGEMENT PORTION

The mixture of liquids exposed to the electric field of portion 6 flows essentially horizontally through portion 11. Admittedly, portion or zone 11 is no more than the volume within vessel 1 downstream of the electrostatic portion 6. However, this relatively quiescent zone enables a significant amount of coalesced liquids to disengage and gravitate upward, or downward, as a part of the separation goal. By flowing these liquids through portion 11 horizontally, disengagement of the oil from the water and the water from the oil is provided within a minimum of opposing flow which would delay their separation.

Of course, not all of the liquids disengage from each other but remain as the mixture carried from zone 11 into the downstream portion 12 in which is mounted a mechanical separation structure.

MECHANICAL SEPARATION PORTION

The mechanical inclined surface separator contained within portion 12 of the preferred embodiment in FIG. 1 consists of a system of corrugated sheets or plates mounted vertically and parallel to the longitudinal axis of the vessel 1. The corrugated sheets may be composed of plastic, fiberglass, or any other electrically nonconductive material, the only other stipulation being chemical and mechanical stability in hydrocarbon fluids at temperatures of intended operation. Each sheet is mounted in such a way that the corrugations form an angle of between 30° to 60° with respect to the horizontal. The corrugations on every other sheet are parallel. However, the corrugations on adjacent sheets are crossed; in other words, while the corrugations on one plate rise in the general direction of fluid flow, the corrugations on adjacent plates decline in the general direction of fluid flow. The relative configurations of adjacent sheets 51, 52 is illustrated in FIG. 2. The appearance of the face of the separator of the preferred embodiment (perpendicular to the general direction of fluid flow) is illustrated in FIG. 3. As a result of the corrugations on each plate and the manner in which the plates are mounted, fluids which flow through the separator are forced to follow a path characterized by multiple changes in the direction of flow. Characteristically, an inclined surface separator is operated at as low a superficial fluid velocity as is practical in order to increase the residence time of the fluids in the medium and to maintain quiescent settling conditions.

The multiple changes in direction of flow characteristic of the medium described above produce a low degree of turbulence or eddy formation within the medium at low superficial fluid velocities. On the surface, one might expect this turbulence or eddy formation to be a detriment to the coalescence efficiency of the medium. Certainly, the greater is the fluid velocity gradient experienced by a droplet of dispersed phase, the greater will be the residence time required in the medium before it can settle (or rise) and be collected on a surface. However, multiple changes in the direction of fluid flow and the resulting eddy formation also have the effect of producing a pressure drop across the medium which facilitates a more even distribution of the fluid over the cross section of the medium.

At any given superficial fluid velocity, the residence time of any given element of fluid increases as more of the cross section of the medium is utilized. This more effective utilization of the cross section of the medium can greatly outweigh the negative effects of eddy formation at sufficiently low Reynold's number for flow within the medium. Experience has shown that Reynold's numbers less than 100 are acceptable. It should also be noted that a low level of turbulence may also enhance the collision frequency of entrained droplets of the dispersed phase. The benefits of low energy mixing in this regard are well documented. The preferred application of the mechanical separator described above would extend the coalescence medium over the entire cross section of the vessel. That portion above the oil/water interface would function to coalesce droplets of dispersed water to sizes larger than obtainable from the electric field. That portion below the oil/water interface would function to coalesce droplets of oil dispersed in the body of water formed through partial dehydration of the oil upstream of the mechanical separator.

The greatest benefit to coalescence and the ultimate disengagement of the two phases from either dispersion received by the coalescence medium will be derived when as narrow a spacing between collection surfaces as is practical is employed so as to limit the distance a droplet of dispersed phase must gravitate before being collected. The spacing between coalescence surfaces in the coalescence medium described above is controlled by the flute size on the corrugated sheets 51, 52 that make up the medium and the angle between the corrugations and the horizontal. The preferred spacing between collection surfaces is influenced by the concentration of insoluble material (mineral matter, resins, asphaltenes) in the oil. The tendency of the passageways in the medium to plug increases with increasing concentration of solids in the oil and decreasing spacing between the collection surfaces. Solids content may also influence the material from which the coalescence medium is fabricated. If the solids content is high and frequent cleaning is anticipated, resistance to the elevated temperatures of pressurized cleaning steam would be required.

Downstream of the mechanical separator in portion 12 a volumetric section of the vessel 1 is provided for the disengagement of the additionally coalesced dispersed phases issuing from the mechanical separator. Water dispersed in the oil continuous phase and oil dispersed in the water continuous phase are thus given further opportunity to disengage. Separated water exits the vessel 1 through the lower outlet 4.

CHARGE TRANSFER BY ELECTRICAL INSULATORS

Conduction of electricity by a liquid such as salt water occurs by means of migration of pre-existing cations and anions to oppositely charged electrodes where electrochemical oxidation or reduction of the ions takes place. In an electrically nonconductive or insulating liquid, such as a hydrocarbon, few ions exist to carry current. However, if electrodes in contact with the liquid are highly charged, mechanisms exist by which charges are generated within the liquid allowing a small current to exist. These mechanisms include the following:

First, a few ions and electrons will be present in any insulating fluid as a result of natural radioactive decay and ionization caused by the passage of omnipresent cosmic rays. Under the influence of a strong electric field free electrons may be accelerated to velocities great enough to dislodge electrons from neutral molecules through collision. These dislodged electrons may then also be accelerated, producing further collisions and generating more free electrons and ions resulting in an avalanche effect. Electrode surfaces which are charged positive and possess a small radius of curvature are primarily responsible for this mechanism of ionization of molecules in an insulating liquid.

A second mechanism is predominantly operative in the vicinity of a highly charge negative electrode. The electrons of a negatively charged metallic electrode possess sufficient kinetic energy that some electrons can escape the conductor and be propelled into the surrounding medium. The probability of escape increases with increasing charge density on the electrode. These electrons may, depending on their velocities, dislodge more electrons from neutral molecules or become captured. As noted previously, these dislodged electrons may be accelerated by the electric field in an electrode system to sufficient velocities to produce further collisions generating more free electrons and ions.

A third mechanism by which charged particles may be generated in an insulating liquid is thermo-ionic emission. When either of the previous described mechanisms are operative and electrodes are highly charged, current densities in localized areas can be such that enough heat is generated in local areas of the electrodes to greatly increase the kinetic energy of mobile electrons of the conductor. This results in an increase in the escape of electrons from the conductor and a surge in current density. Thermo-ionic emission is often a prelude to an arcing condition which can result in considerable ion formation in the insulating liquid.

Even in the absence of arcing the amount of charge transferred to an insulating liquid by high voltage electrodes in a coalescence system is significant with regard to the charging of entrained droplets of an aqueous phase. It has been demonstrated that copper spheres will require a net charge of approximately $10^{-12}$ Coulombs while settling under the influence of gravity in kerosene between vertical parallel plate electrodes spaced 20 centimeters apart with a potential electrical difference of 15 kilovolts. The copper spheres did not come in physical contact with an electrode, but acquired charge in proportion to the nearness of approach to a charged electrode. In our laboratories the potential, with respect to ground, on electrically conductive rods has been measured in dry, crude oil at various distances from positively or negatively charged electrodes held at 33 kilovolts. Voltages of 20 kilovolts have been measured on rods 6 inches from electrodes so charged. With increasing distance from the electrode, the measured voltage decreased, but voltages in excess of 10 kilovolts were measured even at distances up to 45 centimeters from a charged electrode. Voltages are found to be diminished in proportion to the amount of an entrained aqueous phase present. Therefore, convective transfer of charge from a charged electrode by the insulating continuous phase is an important charging mechanism for entrained droplets of an aqueous phase.

It has been observed in our laboratories that an electrically nonconductive or insulating material will acquire a surface charge when placed downstream of high voltage electrodes in bench scale electrostatic coalescence systems. In these experiments, a transparent hydrocarbon phase containing an entrained aqueous phase of 1 to 2 volume % was made to flow first through a system of high voltage electrodes where coalescence of droplets took place, followed by a quiescent zone where large droplets gravitated from the mixture and finally through a system of vertical corrugated sheets of polypropylene. The emulsion which entered the system of polypropylene sheets contained less than 0.5 volume % entrained aqueous phase. It was observed that sufficient charge was transferred to the polypropylene to exert a signficant influence on entrained droplets of the aqueous phase and to promote further electrostatically enhanced coalescence. It was also observed that the surface charge on the insulating material decreased with increasing distance from the charging electrodes.

The source of charge on the insulating polypropylene sheets in these experiments was adsorption of charged particles generated in the hydrocarbon phase in the electrode system and transported downstream of the electrodes by fluid flow. These adsorbed species are relatively mobile and may be compared to a two-dimensional electrically conductive liquid. However, the conductivity or time constant for charge transfer is sufficiently low that the polypropylene sheets do not discharge immediately to ground as would a conductor with mobile free electrons. The result is then a buildup of surface charge which is not equally distributed over the surface of the insulators. As observed experimentally, the greatest surface charge is seen in those areas nearest the electrode system which are exposed first to the charged ions carried by the hydrocarbon and to some extent charged droplets of entrained aqueous phase. The surface charge degrades to voltages insufficient to affect entrained water droplets over a distance of a few inches.

A partial listing of possible materials of construction for the mechanical plate separator 12 would include polypropylene, acrylic, lexan, polyethylene, PTFE, acetal, polyvinylchloride, polystyrene, nylon, and quartz.

CONCLUSION

Both electrostatic coalescence and the coalescence effected by an inclined surface separator are subject to limitations in the separation of emulsions of water or brine in oil. Electrostatic coalescence devices are capable of coalescing extremely small water droplets, but there is an upper limit to the droplet size achievable determined by the physical properties of the two phases and the characteristics of the electric field employed. If water droplet diameters could be increased beyond this upper limit, retention times required to effect adequate phase disengagement would be reduced. The inclined surface separator is not a feasible device for the coalescence of very small water droplets, but is ideally suited for further coalescence of water droplets produced by electrostatically enhanced coalescence. In tandem, electrostatic and mechanical coalescence mechanisms can facilitate dehydration of an oil at higher loading rates and/or lower temperatures than either mechanism acting alone.

Experiments in our laboratories have shown that if the inclined surface separator is fabricated from electrically insulating material, sufficient charge is transferred by the continuous hydrocarbon phase from the electrodes to the mechanical coalescence medium to cause further electrostatically enhanced coalescence of the entrained aqueous phase. Experience has shown that the amount of charge actually transferred to the mechanical medium is such that destructive electrostatic effects caused by large electrical gradients and nonhomogenous electrical fields are essentially absent as evidenced by significant improvement in the coalescence efficiency of the mechanical medium when surface charges are present.

In final conclusion, the use of an electrostatic treating system in tandem with an inclined surface separator made from electrically insulating materials offers the advantage of more efficient dehydration of the oil and cleanup of produced water in the same vessel.

I claim:

1. An apparatus for separating flowing emulsion of oil and water, comprising:

a horizontally elongated vessel having first and second ends for receiving the emulsion flow proximate the first end and conducting the received emulsion through a separation section disposed intermediate the first and second ends, and discharging the separated oil and water proximate the second end;

wherein the separation system includes, an electrostatic portion for inducing separation of the oil and water by imparting an electrostatic charge to the emulsion flowing therethrough;

a mechanical portion, disposed downstream of the electrostatic portion, for further inducing separation of the oil and water, the mechanical portion further including, a plurality of spaced apart, corrugated, collecting plates oriented substantially parallel to the emulsion flow, each plate mounted with the corrugations thereof forming an angle with respect to the horizontal and being crossed with respect to the corrugations of the adjacent plates, resulting in alternating rising and declining corrugations among the collecting plates, the plates being composed of an electrically non-conductive material for accepting from the emulsion at least a portion of the electrostatic charge imparted by the electrostatic portion of the separation section.

2. The apparatus as recited in claim 1, wherein the separation section further includes:
   a heating portion, disposed upstream of the electrostatic portion, having means for heating the received emulsion.

3. The apparatus as cited in claim 1, wherein the separation section further includes,
   a relatively quiescent portion, disposed between the electrostatic portion and the mechanical portion.

4. The apparatus as recited in claim 3, wherein the separation section further includes,
   a second relatively quiescent portion disposed downstream of the mechanical portion.

5. The apparatus as recited in claim 1, wherein the nonconductive material is a manufactured polymer such as polyethylene, polypropylene, polyvinylchloride, or the like.

* * * * *